US011055584B2

United States Patent
Aoba et al.

(10) Patent No.: US 11,055,584 B2
(45) Date of Patent: Jul. 6, 2021

(54) IMAGE PROCESSING APPARATUS, IMAGE PROCESSING METHOD, AND NON-TRANSITORY COMPUTER-READABLE STORAGE MEDIUM THAT PERFORM CLASS IDENTIFICATION OF AN INPUT IMAGE USING A DISCRIMINATOR THAT HAS UNDERGONE LEARNING TO PERFORM CLASS IDENTIFICATION AT DIFFERENT GRANULARITIES

(71) Applicant: CANON KABUSHIKI KAISHA, Tokyo (JP)

(72) Inventors: Masato Aoba, Tokyo (JP); Yasuhiro Komori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 16/028,633

(22) Filed: Jul. 6, 2018

(65) Prior Publication Data

US 2019/0012582 A1 Jan. 10, 2019

(30) Foreign Application Priority Data

Jul. 10, 2017 (JP) .............................. JP2017-134949

(51) Int. Cl.
*G06K 9/62* (2006.01)
*G06K 9/46* (2006.01)
(Continued)

(52) U.S. Cl.
CPC ....... *G06K 9/6857* (2013.01); *G06K 9/00664* (2013.01); *G06K 9/00671* (2013.01);
(Continued)

(58) Field of Classification Search
USPC ......................................... 382/157, 190, 225
See application file for complete search history.

(56) References Cited

U.S. PATENT DOCUMENTS

| 5,761,385 A * | 6/1998 | Quinn ................ G06K 9/00476 706/15 |
| 5,774,631 A * | 6/1998 | Chiabrera ............ G06N 3/0675 706/20 |

(Continued)

FOREIGN PATENT DOCUMENTS

JP          4155875 B2      9/2008

OTHER PUBLICATIONS

Naphade et al, "Multi-Granular Detection of Regional Semantic Concepts", 2004 IEEE INternational Conference on Multimedia and Expo (ISME) pp. 109-112 (Year: 2004).*

(Continued)

*Primary Examiner* — Kathleen Y Dulaney
(74) *Attorney, Agent, or Firm* — Rossi, Kimms & McDowell LLP

(57) ABSTRACT

An image processing apparatus comprising: a learning unit configured to perform learning of a discriminator based on an image feature amount in a first image and a class of the first image defined by a first granularity; an evaluation unit configured to evaluate an image feature amount in a second image whose class is known by the discriminator after the learning; and a control unit configured to control the learning unit to, in a case in which the evaluation by the evaluation unit is that a predetermined criterion is not satisfied, perform the learning of the discriminator based on the image feature amount in the first image and a class of the first image defined by a second granularity coarser than the first granularity.

17 Claims, 12 Drawing Sheets

(51) Int. Cl.
  *G06K 9/68* (2006.01)
  *G06T 7/136* (2017.01)
  *G06K 9/00* (2006.01)
(52) U.S. Cl.
  CPC ......... *G06K 9/4642* (2013.01); *G06K 9/6268* (2013.01); *G06K 9/6281* (2013.01); *G06T 7/136* (2017.01); *G06T 2207/20016* (2013.01); *G06T 2207/20081* (2013.01)

(56) References Cited

U.S. PATENT DOCUMENTS

| | | | | |
|---|---|---|---|---|
| 6,724,942 | B1* | 4/2004 | Arai | G06T 5/004 358/447 |
| 7,783,115 | B2* | 8/2010 | Matsui | G11B 27/28 382/227 |
| 7,940,325 | B2* | 5/2011 | Kim | H04N 5/23248 348/364 |
| 8,009,919 | B2* | 8/2011 | Baiping | G11B 27/32 382/225 |
| 8,532,360 | B2* | 9/2013 | Suri | A61B 8/0891 382/131 |
| 8,909,563 | B1* | 12/2014 | Jing | G06K 9/6267 706/12 |
| 9,025,811 | B1* | 5/2015 | Ioffe | G06F 16/5838 382/100 |
| 9,679,252 | B2* | 6/2017 | Grokop | G06F 1/3234 |
| 9,830,534 | B1* | 11/2017 | Ravichandran | G06K 9/22 |
| 9,928,448 | B1* | 3/2018 | Merler | G06K 9/6285 |
| 2003/0059106 | A1* | 3/2003 | Gutta | G08B 21/0423 382/158 |
| 2007/0025606 | A1* | 2/2007 | Gholap | G06F 16/58 382/128 |
| 2010/0153386 | A1* | 6/2010 | Tysowski | G06F 16/487 707/736 |
| 2010/0290699 | A1* | 11/2010 | Adam | G06F 16/50 382/155 |
| 2011/0052063 | A1* | 3/2011 | McAuley | G06K 9/00684 382/180 |
| 2011/0055266 | A1* | 3/2011 | Varadarajan | G06F 16/583 707/780 |
| 2014/0056541 | A1* | 2/2014 | Inoue | H04N 21/458 382/306 |
| 2015/0016699 | A1* | 1/2015 | Ritt | G06K 9/6227 382/128 |
| 2015/0347826 | A1* | 12/2015 | Dugan | G06K 9/00228 382/118 |
| 2016/0253466 | A1* | 9/2016 | Agaian | G06N 5/043 382/128 |
| 2017/0109615 | A1* | 4/2017 | Yatziv | G06F 16/5866 |
| 2017/0220907 | A1* | 8/2017 | Liu | G06K 9/726 |
| 2017/0262414 | A1* | 9/2017 | Pao | G06F 40/109 |
| 2017/0262737 | A1* | 9/2017 | Rabinovich | G06N 3/0454 |
| 2017/0330319 | A1* | 11/2017 | Xu | G06T 7/73 |
| 2018/0007364 | A1* | 1/2018 | Noraz | H04N 19/182 |
| 2018/0068426 | A1* | 3/2018 | Matsunaga | G06T 5/009 |
| 2019/0180146 | A1* | 6/2019 | Sacheti | G06K 9/6271 |

OTHER PUBLICATIONS

Arbelàez et al. "Contour Detection and Hierarchical Image Segmentation." IEEE Transactions on Pattern Analysis and Machine Intelligence. May 2011: 1-20. vol. 33, Issue: 5.

Achanta et al. "SLIC Superpixels." EPFL Technical Report 149300. Jun. 2010: 1-15.

Long et al. "Fully Convolutional Networks for Semantic Segmentation." IEEE Conference on Computer Vision and Pattern Recognition. 2015: 1-10.

Platt "Probabilistic Outputs for Support Vector Machines and Comparisons to Regularized Likelihood Methods." MIT Press. 1999: 1-11.

* cited by examiner

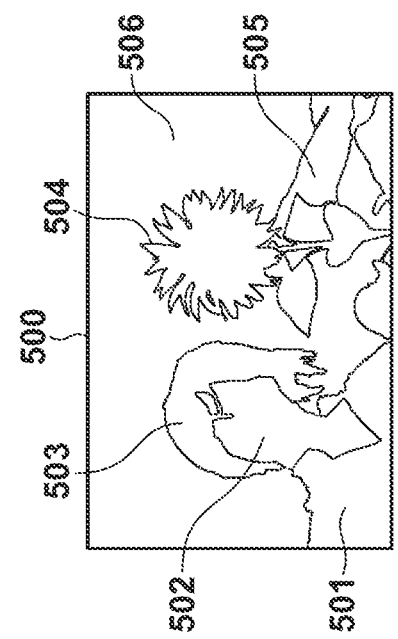
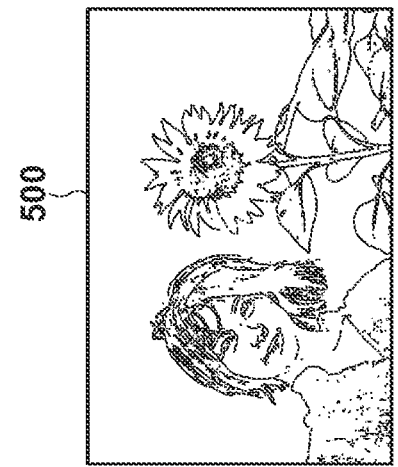

FIG. 4A

CLASS INDEX TABLE

| CLASS TABLE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | FLOWER | LEAF | TREE TRUNK | BUILDING | AUTO- MOBILE | MOTOR- CYCLE | BICYCLE | HAIR | SKIN | CLOTH- ING | ANIMAL | GRASSY PLAIN | SOIL SURFACE | ROAD | SKY | CLOUD |

FIG. 4B

CLASS INDEX TABLE

| CLASS TABLE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 2 | FLOWERING PLANT | | TREE TRUNK | BUILDING | AUTO- MOBILE | MOTO- RCYCLE | BICYCLE | FACE | | CLOTH- ING | ANIMAL | GRASSY PLAIN | SOIL SURFACE | ROAD | SKY | CLOUD |
| 1 | FLOWER | LEAF | TREE TRUNK | BUILDING | AUTO- MOBILE | MOTO- RCYCLE | BICYCLE | HAIR | SKIN | CLOTH- ING | ANIMAL | GRASSY PLAIN | SOIL SURFACE | ROAD | SKY | CLOUD |

FIG. 4C

CLASS INDEX TABLE

| CLASS TABLE NUMBER | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 7 | | | | | | | | UNCLASSIFIABLE | | | | | | | | |
| 6 | | | | | | | | NON-SKY | | | | | | | | SKY |
| 5 | PLANT | | | | ARTIFACT | | | | ANIMAL | | | | | | | SKY |
| 4 | PLANT | | | BUILDING | VEHICLE | | | | ANIMAL | | | | GROUND | | SKY | CLOUD |
| 3 | FLOWERING PLANT | | TREE TRUNK | BUILDING | AUTO- MOBILE | TWO-WHEELED VEHICLE | | PERSON | | | ANIMAL | | UNPAVED SURFACE | ROAD | SKY | CLOUD |
| 2 | FLOWERING PLANT | | TREE TRUNK | BUILDING | AUTO- MOBILE | MOTO- RCYCLE | BICYCLE | FACE | | CLOTH- ING | ANIMAL | GRASSY PLAIN | SOIL SURFACE | ROAD | SKY | CLOUD |
| 1 | FLOWER | LEAF | TREE TRUNK | BUILDING | AUTO- MOBILE | MOTO- RCYCLE | BICYCLE | HAIR | SKIN | CLOTH- ING | ANIMAL | GRASSY PLAIN | SOIL SURFACE | ROAD | SKY | CLOUD |

FIG. 5A

|  |  | BLUR AMOUNT B(p) [pix] | |
|---|---|---|---|
|  |  | B(p) < 3 | 3 ≤ B(p) |
| IMAGE MAGNIFICATION S(p) [pix/m] | 200 ≤ S(p) | 1 | 2 |
|  | S(p) < 200 | 2 | 2 |

FIG. 5B

|  |  | BLUR AMOUNT B(p) [pix] | | | | | |
|---|---|---|---|---|---|---|---|
|  |  | B(p) < 3 | 3~5 | 5~10 | 10~20 | 20~50 | 50 ≤ B(p) |
| IMAGE MAGNIFICATION S(p) [pix/m] | 200 ≤ S(p) | 1 | 2 | 3 | 4 | 5 | 6 |
|  | 200~50 | 2 | 3 | 4 | 5 | 5 | 6 |
|  | 50~20 | 3 | 4 | 5 | 5 | 6 | 6 |
|  | 20~5 | 4 | 5 | 5 | 6 | 6 | 7 |
|  | 5~1 | 5 | 5 | 6 | 6 | 7 | 7 |
|  | 1~0.1 | 5 | 6 | 6 | 7 | 7 | 7 |
|  | S(p) < 0.1 | 6 | 6 | 7 | 7 | 7 | 7 |

| CLASS TABLE NUMBER | CLASS COUNT | \multicolumn{16}{c}{CLASS INDEX TABLE} | | | | | | | | | | | | | | | |
|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| 7 | 1 | UNCLAS-SIFIABLE | (UNUSED) | | | | | | | | | | | | | | |
| 6 | 2 | NON-SKY | SKY | (UNUSED) | | | | | | | | | | | | | |
| 5 | 5 | PLANT | ARTIFACT | ANIMAL | GROUND | SKY | (UNUSED) | | | | | | | | | | |
| 4 | 7 | PLANT | BUILDING | VEHICLE | ANIMAL | GROUND | SKY | CLOUD | (UNUSED) | | | | | | | | |
| 3 | 11 | FLOWERING PLANT | TREE TRUNK | BUILDING | AUTO-MOBILE | TWO-WHEELED VEHICLE | PERSON | ANIMAL | UNPAVED ROAD | ROAD | SKY | CLOUD | (UNUSED) | | | | |
| 2 | 14 | FLOWERING PLANT | TREE TRUNK | BUILDING | AUTO-MOBILE | MOTOR-CYCLE | BICYCLE | FACE | CLOTH-ING | ANIMAL | GRASSY PLAIN | SOIL SURFACE | ROAD | SKY | CLOUD | (UNUSED) | |
| 1 | 16 | FLOWER | LEAF | TREE TRUNK | BUILDING | AUTO-MOBILE | MOTOR-CYCLE | BICYCLE | HAIR | SKIN | CLOTH-ING | ANIMAL | GRASSY PLAIN | SOIL SURFACE | ROAD | SKY | CLOUD |

IMAGE PROCESSING APPARATUS, IMAGE PROCESSING METHOD, AND NON-TRANSITORY COMPUTER-READABLE STORAGE MEDIUM THAT PERFORM CLASS IDENTIFICATION OF AN INPUT IMAGE USING A DISCRIMINATOR THAT HAS UNDERGONE LEARNING TO PERFORM CLASS IDENTIFICATION AT DIFFERENT GRANULARITIES

BACKGROUND OF THE INVENTION

Field of the Invention

The present invention relates to a class identification technique.

Description of the Related Art

Many studies for segmenting an image into a plurality of regions have been conducted. In recent years, studies have been made concerning a problem to extract a semantic region such as the region of a person, the region of an automobile, the region of a road, the region of a building, the region of sky, or the like from an image. This problem is called semantic segmentation and is considered to be applicable to, for example, image correction or scene interpretation corresponding to the type of an object.

There have been proposed many methods of performing identification of a class label concerning each position in an image not on a pixel basis but on a small region (superpixel) basis when performing semantic segmentation. Small regions are mainly extracted from an image as regions having similar features, and various methods have been proposed. Representative methods are a texture-based method such as P. Arbelaez, M. Maire, C. Fowlkes, and J. Malik, "Contour Detection and Hierarchical Image Segmentation", PAMI2010 and a clustering-based method such as R. Achanta, A. Shaji, K. Smith, A. Lucchi, P. Fua, and S. Susstrunk, "SLIC Superpixels", EPFL Technical Report, 2010. For each small region obtained in this way, a class label is identified using the feature amount inside the small region or the context feature amount on the periphery together. Normally, a local-based region discriminator is learned using various training images, thereby performing region identification.

In recent years, studies on semantic segmentation using deep learning have also been carried out. In Long, Shelhamer, and Darrell, "Fully Convolutional Networks for Semantic Segmentation", CVPR2015, an intermediate layer output of a CNN (Convolutional Neural Network) is used as a feature amount, and class determination results of pixels based on a plurality of intermediate layer features are integrated, thereby performing semantic segmentation of an image. In the method of Long, Shelhamer, and Darrell, "Fully Convolutional Networks for Semantic Segmentation", CVPR2015, the class of each pixel is directly be determined without using small region segmentation results as described above.

A class of region segmentation is normally uniquely defined by a user, and a class discriminator is learned in accordance with the definition. For example, when five classes "sky", "tree", "grass", "person", and "other" are defined as region classes, a discriminator that identifies these five classes is learned. In identification processing for an input image, any one of the five classes is output for each region. The types of classes to be defined are decided by the request of the user. The finer the granularity of a class is, the larger the required information amount of an image feature is. For example, as for a 2-class discriminator configured to identify the "sky" region and regions "other than sky" and an 8-class discriminator configured to identify "sky", "tree", "grass", "rock", "person", "automobile", "building", and "other than these", the latter needs to extract finer features from an image.

However, depending on an image capturing condition, the quality of an acquired image may be insufficient, and the defined classes may be difficult to identify. For example, in an image captured at a long distance, "grass" and "tree" may be indistinguishable. In a dark backlight image at dusk, "rock" and "grass" may cause a shadow-detail loss and have the same texture. Additionally, concerning a region in which a strong blur occurs due to image capturing using a lens of a shallow focal depth, features may disappear, and "tree", "rock", and "person" may be indistinguishable.

As one method of solving the problem, it is considered that the image capturing condition is changed for each recognition. In Japanese Patent No. 4155875, it is determined whether an input image is an image suitable for recognition, and upon determining that the image is not suitable, at least one of information of an image capturing state and information for improving the image capturing state is notified to a user. This gives a suggestion to the user to capture an image under an image capturing condition for each recognition.

The method of changing the image capturing condition in the above-described way is effective when the final task is to recognize an object in front of the user. However, if the purpose is to "improve image quality by changing post-processing for each region" of an image captured under an image capturing condition intentionally decided by the user, an image capturing condition unintended by the user is forced. In addition, it is difficult to apply this method when performing recognition processing for an already captured image.

SUMMARY OF THE INVENTION

The present invention has been made in consideration of the above-described problem, and provides a technique for learning a class of a granularity according to image information.

According to the first aspect of the present invention, there is provided an image processing apparatus comprising: a learning unit configured to perform learning of a discriminator based on an image feature amount in a first image and a class of the first image defined by a first granularity; an evaluation unit configured to evaluate an image feature amount in a second image whose class is known by the discriminator after the learning; and a control unit configured to control the learning unit to, in a case in which the evaluation by the evaluation unit is that a predetermined criterion is not satisfied, perform the learning of the discriminator based on the image feature amount in the first image and a class of the first image defined by a second granularity coarser than the first granularity.

According to the second aspect of the present invention, there is provided an image processing apparatus comprising: a learning unit configured to perform learning of a discriminator based on an image feature amount in a first image and a class of the first image defined by a first granularity; an evaluation unit configured to evaluate an image feature amount in a second image whose class is known by the discriminator after the learning; and a control unit configured to control the learning unit to, in a case in which the evaluation by the evaluation unit is that a predetermined criterion is not satisfied, perform the learning of another discriminator different to the discriminator based on the image feature amount in the first image and a class of the first image defined by a second granularity coarser than the first granularity.

According to the third aspect of the present invention, there is provided an image processing method performed by an image processing apparatus, comprising: performing learning of a discriminator based on an image feature amount in a first image and a class of the first image defined by a first granularity; evaluating an image feature amount in a second image whose class is known by the discriminator after the learning; and in a case in which the evaluation is that a predetermined criterion is not satisfied, performing the learning of the discriminator based on the image feature amount in the first image and a class of the first image defined by a second granularity coarser than the first granularity.

According to the fourth aspect of the present invention, there is provided an image processing method that an image processing apparatus performs, the method comprising: performing learning of a discriminator based on an image feature amount in a first image and a class of the first image defined by a first granularity; evaluating an image feature amount in a second image whose class is known by the discriminator after the learning; and in a case in which the evaluation is that a predetermined criterion is not satisfied, performing the learning of another discriminator different to the discriminator based on the image feature amount in the first image and a class of the first image defined by a second granularity coarser than the first granularity.

According to the fifth aspect of the present invention, there is provided a non-transitory computer-readable storage medium storing a computer program that causes a computer to function as a learning unit configured to perform learning of a discriminator based on an image feature amount in a first image and a class of the first image defined by a first granularity; an evaluation unit configured to evaluate an image feature amount in a second image whose class is known by the discriminator after the learning; and a control unit configured to control the learning unit to, in a case in which the evaluation by the evaluation unit is that a predetermined criterion is not satisfied, perform the learning of the discriminator based on the image feature amount in the first image and a class of the first image defined by a second granularity coarser than the first granularity.

According to the sixth aspect of the present invention, there is provided a non-transitory computer-readable storage medium storing a computer program that causes a computer to function as a learning unit configured to perform learning of a discriminator based on an image feature amount in a first image and a class of the first image defined by a first granularity; an evaluation unit configured to evaluate an image feature amount in a second image whose class is known by the discriminator after the learning; and a control unit configured to control the learning unit to, in a case in which the evaluation by the evaluation unit is that a predetermined criterion is not satisfied, perform the learning of another discriminator different to the discriminator based on the image feature amount in the first image and a class of the first image defined by a second granularity coarser than the first granularity.

Further features of the present invention will become apparent from the following description of exemplary embodiments (with reference to the attached drawings).

BRIEF DESCRIPTION OF THE DRAWINGS

FIG. 3A is a view showing an example of a training image 500;

FIG. 3B is a view showing examples of regions in the training image 500;

FIG. 3C is a view showing an example of small region segmentation;

FIGS. 4A to 4C are views showing examples of the arrangements of class index tables;

FIGS. 5A and 5B are views showing examples of the arrangements of selection conditions;

FIG. 8 is a view showing an example of the arrangement of a class index table;

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 1A:
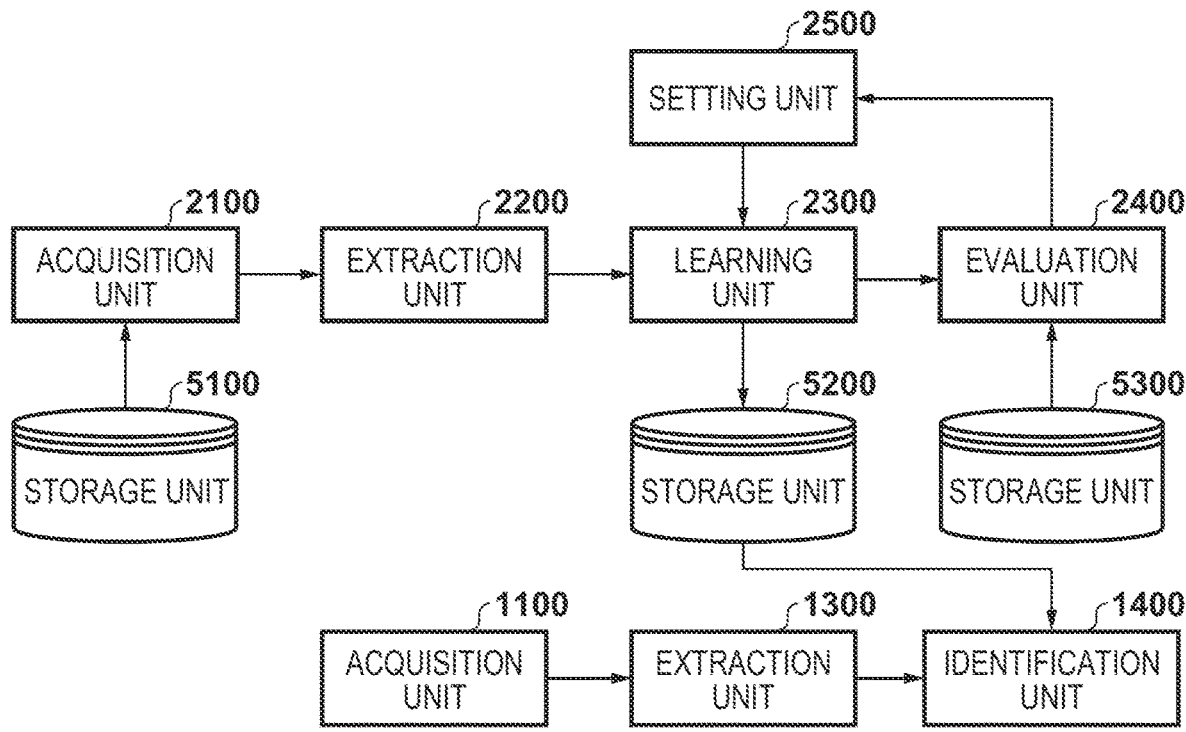
FIGS. 1A and 1B are block diagrams showing examples of the functional arrangement of an image processing apparatus.

An image processing apparatus according to this embodiment has a function (learning function) of performing learning of a region discriminator used to identify (classify) the class of an image region in an image, and a function (identification function) of performing identification (class classification) of the class of an image region in an image using the region discriminator. FIG. 1A shows an example of the functional arrangement of the image processing apparatus according to this embodiment.

<Learning Function>

An arrangement concerning the learning function in the arrangement shown in FIG. 1A will be described first. A storage unit 5100 stores learning data created in advance. The learning data includes a plurality of training images, region class label data that holds the label (index) of the class of each pixel of the training images, and image capturing information including various kinds of information concerning the training images.

An acquisition unit 2100 reads out (acquires) the learning data from the storage unit 5100. An extraction unit 2200 segments each training image included in the learning data acquired by the acquisition unit 2100 into a plurality of small regions and extracts an image feature amount from each small region. A learning unit 2300 performs learning processing based on the image feature amounts extracted from the training images by the extraction unit 2200 and the region class label data included in the learning data acquired by the acquisition unit 2100, thereby generating a region discriminator. A storage unit 5300 stores confirmation data created in advance. The confirmation data includes a plurality of confirmation images, region class label data that holds the label (index) of the class of each pixel of the confirmation images, and image capturing information including various kinds of information concerning the confirmation images. An evaluation unit 2400 reads out (acquires) the confirmation data from the storage unit 5300, and evaluates the region discriminator generated by the learning unit 2300 based on the readout confirmation data. A setting unit 2500 decides (sets) the granularity of each class in class classification based on the evaluation result by the evaluation unit 2400 and the image capturing information included in the confirmation data. After the granularity setting by the setting unit 2500, the learning unit 2300 performs re-learning of the region discriminator in accordance with the set granularities. The learning unit 2300 stores the region discriminator generated by the learning processing in a storage unit 5200.

Figure 2A:
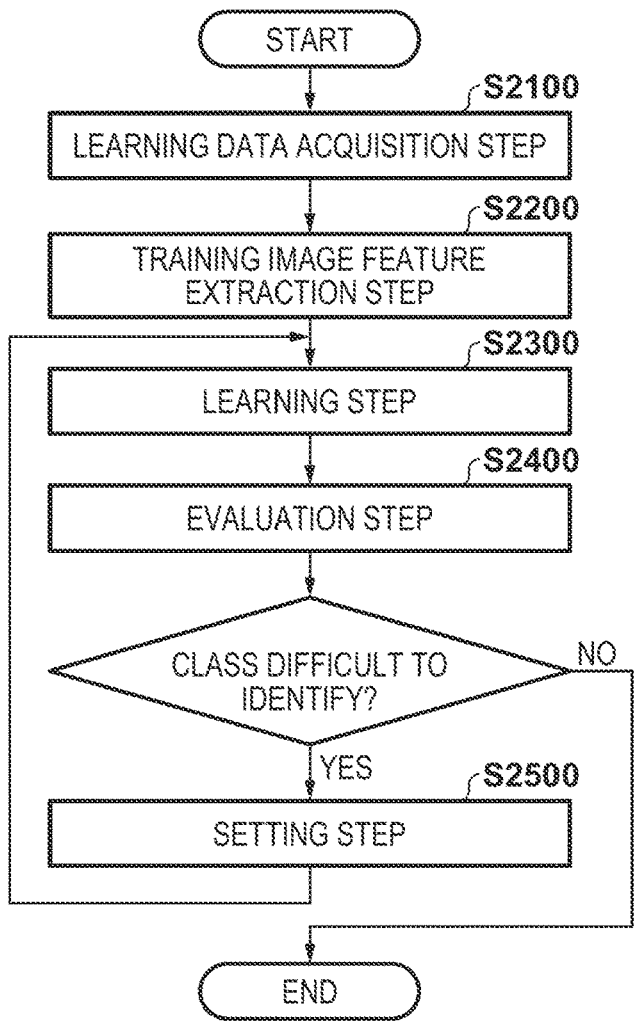
FIGS. 2A and 2B are flowcharts of identification processing.

Learning processing of the region discriminator by the functional units described above will be described next with reference to the flowchart of FIG. 2A.

In step S2100, the acquisition unit 2100 reads out (acquires) learning data from the storage unit 5100. Each training image included in the learning data can be any image as long as it is an image including image regions of one or more types of image attributes. In this embodiment, the plurality of training images included in the learning data are assumed to be a plurality of training images captured by an image capturing unit such as a digital camera. The number of training images included in the learning data is represented by N (N is a natural number). The learning data includes region class label data corresponding to each of the N training images.

The region class label data will be described here. A training image 500 shown in FIG. 3A includes a plurality of regions of different image attributes such as a region 501 of clothing, a region 502 of a face, a region 503 of hair, a region 504 of a flower, a region 505 of a leaf, and a region 506 of sky, as shown in FIG. 3B. A label corresponding to a class "clothing" is assigned to each pixel belonging to the region 501, a label corresponding to a class "face" is assigned to each pixel belonging to the region 502, and a label corresponding to a class "hair" is assigned to each pixel belonging to the region 503. In addition, a label corresponding to a class "flower" is assigned to each pixel belonging to the region 504, a label corresponding to a class "leaf" is assigned to each pixel belonging to the region 505, and a label corresponding to a class "sky" is assigned to each pixel belonging to the region 506. The region class label data corresponding to the training image 500 holds the labels assigned to the pixels of the training image 500. That is, the region class label data corresponding to the training image 500 sets the label corresponding to the class "clothing" to the pixel values of the pixels belonging to the region 501 in the training image 500 shown in FIG. 3A, the label corresponding to the class "face" to the pixel values of the pixels belonging to the region 502, the label corresponding to the class "hair" to the pixel values of the pixels belonging to the region 503, the label corresponding to the class "flower" to the pixel values of the pixels belonging to the region 504, the label corresponding to the class "leaf" to the pixel values of the pixels belonging to the region 505, and the label corresponding to the class "sky" to the pixel values of the pixels belonging to the region 506. Note that although semantic labels have been exemplified here, labels by the attributes of regions such as glossy surface, matte surface, or high-frequency region may be given. In addition, a class for a region in which a plurality of types of objects such as the sky and branches of a tree are mixed may be defined.

Here, the storage unit 5200 stores a class index table having an arrangement example shown in FIG. 4A. A class table of class table number=1 is registered in the class index table shown in FIG. 4A. Class tables corresponding to class table numbers=2, 3, . . . can additionally be registered in the class index table as needed, as will be described later. As shown in FIG. 4A, labels (class indexes) 1 to 16 corresponding to 16 types of classes ("flower", "leaf", "tree trunk", "building", "automobile", "motorcycle", "bicycle", "hair", "skin", "clothing", "animal", "grassy plain", "soil surface", "road", "sky", and "cloud") are registered in the class table of class table number=1. In the example shown in FIG. 4A, the label of class "flower" is "1". According to this embodiment, in the region class label data, for each pixel of the training image corresponding to the region class label data, the label of the class to which the pixel belongs in labels 1 to 16 of the 16 types of classes is registered. Note that in this embodiment, the maximum number of classes managed on the class index table is 16. However, the maximum number is not limited to 16.

In addition, the image capturing information includes information (image capturing unit information) unique to the image capturing unit that captures the training image and information (image information) unique to the captured training image. As the image capturing unit information, the size or the allowable diameter of a circle of confusion of a sensor of the image capturing unit, the brightness or the focal length of an optical system, and the like are usable. As the image information, an aperture value, a focus distance, a Bv value, a RAW image, an exposure time, a gain (ISO sensitivity), a white balance coefficient, distance information, position information by a GPS, time information such as a date/time, and the like are usable. In addition, a gravity sensor value, an acceleration, a geomagnetic direction, a temperature, a humidity, an atmospheric pressure, an altitude, and the like at the time of image capturing are also usable. There is also an image capturing system capable of obtaining information of infrared light or ultraviolet light in addition to visible light. The configuration of image capturing information changes depending on the specifications of the image capturing unit or the like.

Furthermore, the image capturing information may include information obtained for each pixel of the training image, and important information obtained by combining pieces of information included in the image capturing information also exists. For example, when a distance Z(p) from the lens surface to an object at a pixel position p and a focal length f of the optical system are included in the image capturing information, an image magnification S(p) at the pixel position p can be calculated by $$S(p) = \frac{f}{Z(p)} \quad (1)$$

When the f-number of the optical system, the focal length f, a focus distance Zf at the time of image capturing, and the distance Z(p) up to the object at the pixel position p are included in the image capturing information, a blur amount B(p) at the pixel position p can be calculated by $$B(p) = \frac{f^2 |Z(p) - z_f|}{FZ_f(Z(p) - f)} \quad (2)$$

Furthermore, when a pixel value r(p) of the R (red) component, a pixel value g(p) of the G (green) component, and a pixel value b(p) of the B (blue) component of a RAW image at the pixel position p, an exposure time T, a gain G, and an aperture amount F are included in the image capturing information, the absolute value of an incident light amount BV(p) at the pixel position p can be obtained by $$BV(p) = \log_2 \frac{F^2(0.3r(p) + 0.6g(p) + 0.1b(p))}{0.3GT} \quad (3)$$

A description will be made below assuming that the blur amount B(p) and the image magnification S(p) at the pixel position p can be obtained from the image capturing information for the sake of simplicity. However, another information such as the incident light amount BV(p) described above may be used, and the combination of information included in the image capturing information is not limited to this. Note that the above-described image capturing information included in the learning data can be used for various application purposes. However, the image capturing information is not used in this embodiment, and the image capturing information need not always be included in the learning data in this embodiment.

Next, in step S2200, the extraction unit 2200 segments each training image included in the learning data acquired by the acquisition unit 2100 in step S2100 into a plurality of small regions and extracts an image feature amount from each small region.

When segmenting an image into small regions and identifying the class of each small region, first, the image is segmented into small regions. The small region is mainly cut out from the image as a small region formed from pixels having similar image feature amounts, and several methods of segmenting an image into small regions have been proposed conventionally. Representative methods are a texture-based method such as P. Arbelaez, M. Maire, C. Fowlkes, and J. Malik, "Contour Detection and Hierarchical Image Segmentation", PAMI2010 and a clustering-based method such as R. Achanta, A. Shaji, K. Smith, A. Lucchi, P. Fua, and S. Susstrunk, "SLIC Superpixels", EPFL Technical Report, 2010 as described above. Alternatively, block regions obtained by simply segmenting an image into rectangles of an even size may be used as small regions. FIG. 3C shows an example in which the training image 500 shown in FIG. 3A is segmented into small regions. Alternatively, when identifying the class for each pixel, as in Long, Shelhamer, and Darrell, "Fully Convolutional Networks for Semantic Segmentation", CVPR2015, instead of performing small region segmentation, each pixel is regarded as one small region, and an image feature amount is extracted from each pixel.

Image feature amounts extracted from a small region are, for example, the color average value or color histogram of the small region, the position or size of the small region, and a texture feature such as LBP but are not limited by the types. In addition, a context feature by the distribution of line segments or colors concerning the periphery of the position of the determination target may be used. A vector in which the signal output values of the intermediate layers of a CNN are listed may be used as an image feature amount. The position of a small region (if the small region is formed from a plurality of pixels, for example, the gravity center position of the plurality of pixels, or if the small region is formed from one pixel, the position of the pixel) on the training image will be expressed as r, and the image feature amount extracted from the small region at the position r in the training image will be expressed as $x_r$ hereinafter.

In step S2300, the learning unit 2300 performs learning processing based on the image feature amount extracted in step S2200 from each small region of each training image and region class label data corresponding to each training image, thereby generating a region discriminator.

First, the learning unit 2300 acquires a label cr assigned to the position r on the training image from the region class label data corresponding to the training image, and generates a supervisory vector $\tau_r$ for the position r using the acquired label cr. The supervisory vector it is defined by $$\tau_r = [\tau_1 \cdots \tau_c \cdots \tau_M] \quad (4)$$

$$\tau_c = \begin{cases} 1 & \text{if } c = c_r \\ 0 & \text{otherwise} \end{cases} \quad (5)$$

In the example shown in FIG. 4A, if, for example, cr=5, the small region at the position r in the training image is the region of an automobile, and the supervisory vector $\tau_r$ corresponding to the position r is {0, 0, 0, 0, 1, 0, 0, 0, 0, 0, 0, 0, 0, 0, 0, 0}. A supervisory vector is thus generated for each small region on each training image.

Learning of the region discriminator by the learning unit 2300 means generating the region discriminator by adjusting the parameters of an identification function f of the region discriminator such that a value obtained by accumulating, for all positions r and all training images, errors between the supervisory vectors $\tau_r$ and output vectors obtained when the image feature amount $x_i$ is input to the identification function f becomes smaller.

The region discriminator receives the image feature amount $x_r$ and outputs a score vector $f(x_r)$ of the class as an output vector. The score vector $f(x_r)$ is an M-dimensional vector (in this embodiment, M=16) as represented by $$f(x_r) = [f_1(x_r) \ldots f_c(x_r) \ldots f_M(x_r)] \quad (6)$$

Each element of the score vector $f(x_r)$ is a score (likelihood indicating a probability) for each class, and $f_c(x_r)$ (c=1, . . . , M) represents a score (likelihood indicating the probability of the class of label=c) for the class of label=c. In the example shown in FIG. 4A, for example, $f_3(x_r)$ represents the score of the class of label=c, that is, the score of "tree trunk".

As the model of the identification function f and the learning method thereof, various models and learning methods are considered, and they are not limited to a specific model and a specific learning method. For example, SVR, a multilayer neural network, logistic regression, or the like may be used.

Next, in step S2400, the evaluation unit 2400 reads out (acquires) confirmation data from the storage unit 5300, and evaluates the region discriminator (the region discriminator after the learning) generated by the learning unit 2300 in step S2300 based on the readout confirmation data. Each confirmation image included in the confirmation data is an image in which the class of each pixel is known (one of the above-described 16 classes), and the pixels of the confirmation image have various image magnifications and blur amounts. Let Nv (Nv is a natural number) be the number of confirmation images included in the confirmation data. Hence, the confirmation data includes region class label data corresponding to each of the Nv confirmation images. The region class label data corresponding to each confirmation image holds a label assigned to each pixel of the confirmation image, like the region class label data corresponding to the training image. In addition, image capturing information included in the confirmation data includes information unique to the image capturing unit that captures the confirmation image and information unique to the captured confirmation image, like the image capturing information included in the learning data.

First, the evaluation unit 2400 segments each confirmation image included in the confirmation data into a plurality of small regions and extracts an image feature amount from each small region, as in step S2200 described above. The position of a small region on the confirmation image will be expressed as s, and the image feature amount extracted from the small region at the position s in the confirmation image will be expressed as $xv_s$ hereinafter. The evaluation unit 2400 performs the following processing for the small region at each position s in the confirmation image.

The evaluation unit 2400 inputs the image feature amount $xv_s$ of the small region at the position s in the confirmation image to the region discriminator generated by the learning unit 2300 in step S2300, thereby obtaining an output vector $f(xv_s)$. The output vector $f(xv_s)$ has a configuration given by $$f(xv_s)=[f_1(xv_s)\ldots f_c(xv_s)\ldots f_M(xv_s)] \quad (7)$$

Then, the evaluation unit 2400 specifies an index $e_s$ of the element having the largest value in the elements $f_1(xv_s), \ldots, f_M(xv_s)$ of the output vector $f(xv_s)$ as the class estimation label index at the position s of the confirmation image by $$e_s = \arg\max_c f_c(xv_s) \quad (8)$$

That is, in step S2400, the class estimation label index at the position s on the confirmation image collected for each confirmation image is acquired as the evaluation result of the region discriminator based on the confirmation data.

In step S2500, the setting unit 2500 decides (sets) the granularity of each class in class classification based on the evaluation result by the evaluation unit 2400 and the image capturing information. An identification rate for the image capturing information of each class is calculated from the evaluation result of the region discriminator using the confirmation image by the evaluation unit 2400 using a method obtained by expanding a technique described in J. C. Platt, "Probabilistic Outputs for Support Vector Machines and Comparisons to Regularized Likelihood Methods" in "Large Margin Classifiers", MIT Press, 1999.

The process of step S2500 to be described below is processing for the class c that is a class of interest. In fact, the same processing is performed for all classes. First, the setting unit 2500 divides a space formed by the image magnification S, the blur amount B, and a likelihood fc concerning the class c into a plurality of bins. Each bin in this space can be expressed as (S, B, fc).

The setting unit 2500 classifies the small regions in each confirmation image included in the confirmation data into small regions (positive data) of class estimation label index=c and small regions (negative data) of class estimation label index≠c. Then, the setting unit 2500 acquires an element $f_c(xv_s)$ of an output vector $f(xv_s)$ obtained by inputting the image feature amount $xv_s$ of each positive data to the region discriminator as the likelihood fc (the probability of the class c) for the positive data. In addition, the setting unit 2500 acquires the element $f_c(xv_s)$ of the output vector $f(xv_s)$ obtained by inputting the image feature amount $xv_s$ of each negative data to the region discriminator as the likelihood fc for the negative data.

Letting S1 and B1 be the image magnification and the blur amount at the position s of positive data, respectively, and fc1 be the likelihood for the positive data, the setting unit 2500 increments the value of a first variable assigned to a bin (S1, B1, fc1) by one. In this way, the frequency of positive data corresponding to each bin is collected as the value of the first variable.

Similarly, letting S2 and B2 be the image magnification and the blur amount at the position s of negative data, respectively, and fc2 be the likelihood for the negative data, the setting unit 2500 increments the value of a second variable assigned to a bin (S2, B2, fc2) by one. In this way, the frequency of negative data corresponding to each bin is collected as the value of the second variable.

The setting unit 2500 obtains, for each bin, (the value of the first variable assigned to the bin/the value of the second variable assigned to the bin) as "an identification rate (correct answer rate) R of the class c" in the bin.

Figure 6A:
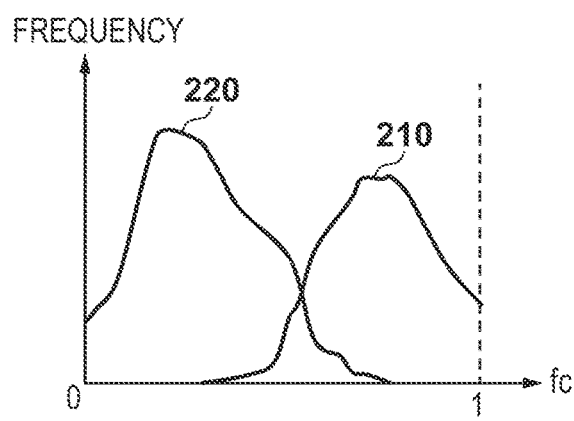
FIGS. 6A to 6D are views for explaining step S2500.
Figure 6B:
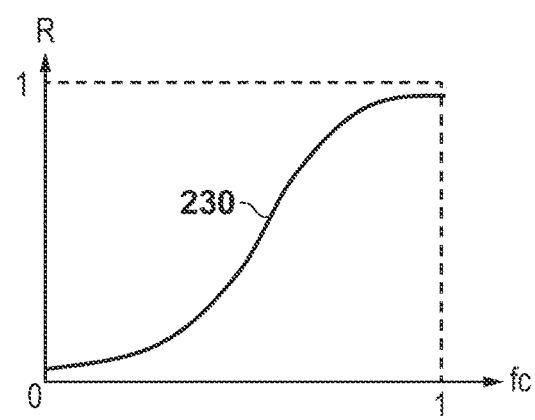
Figure 6C:
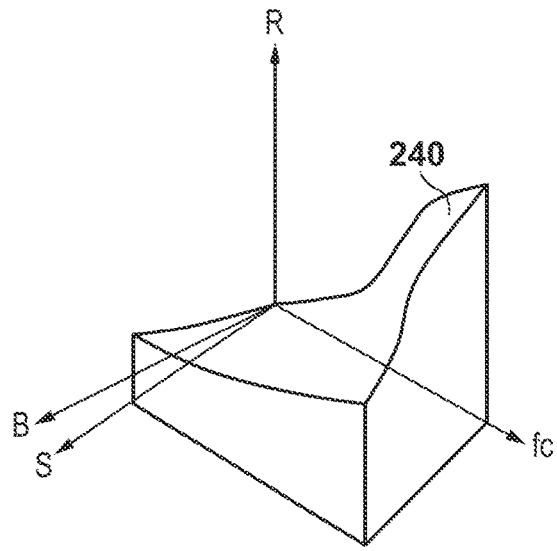

FIG. 6A shows an example of a plot of a histogram 210 of positive data and a histogram 220 of negative data in the certain image magnification S and blur amount B. The histogram 210 represents the histogram value (frequency) of the positive data for each likelihood fc, and the histogram 220 represents the histogram value (frequency) of the negative data for each likelihood fc. FIG. 6B shows a histogram 230 that is obtained by plotting (the histogram value of the histogram 210/the histogram value of the histogram 220) for each likelihood fc in FIG. 6A. The histogram 230 represents the identification rate R of the class c for each likelihood fc. For each bin, (the value of the first variable in the bin/the value of the second variable in the bin) is obtained as the identification rate R for the bin. In addition, FIG. 6C shows a graph 240 representing the identification rate R (=R(S, B, fc)) for (image magnification S, blur amount B, likelihood fc).

Here, a reliability likelihood λ is defined, and the identification rate when fc=λ is expressed as Rλ. The reliability likelihood λ is set to, for example, 0.8. Letting θ be the allowable threshold of the identification rate Rλ and, for example, θ=0.9 is set. If Rλ is equal to or more than θ the identification rate of the class c by the region discriminator can be determined as high. If Rλ is less than θ (less than the threshold), the identification rate of the class c by the region discriminator can be determined as low. A hatched portion 250 in FIG. 6D indicates the range of Rλ<θ in the graph 240.

The pixels of the image magnification S and the blur amount B included in the range of the hatched portion 250 can hardly be classified into the class c because of the shortage of the image feature amount. Hence, in this embodiment, if at least one of the identification rates R of the bins in the space created for the class c satisfies R<θ, the setting unit 2500 additionally registers, in the class index table, a class table in which the class c is changed to a class c' of a granularity coarser by one step. In addition, the setting unit 2500 creates a selection condition to select the additionally registered class table for the range of B and S corresponding to the bin for which R<θ holds if at least one of the identification rates R of the bins in the space created for the class c satisfies R<θ.

That is, when a class is set concerning the range of image capturing information which is difficult to discriminate, the relationship between the set class and a corresponding label is added to the class index table as a new class table, and a selection condition according to the image capturing condition of each class table is created.

FIG. 4B shows an example of a class index table formed by additionally registering a new class table in the class index table shown in FIG. 4A. FIG. 5A shows an example of a table (selection conditions) in which conditions concerning image capturing information to select the class tables shown in FIG. 4B are registered. FIG. 4C shows an example of a class index table formed by additionally registering a new class table in the class index table shown in FIG. 4B. FIG. 5B shows an example of a table (selection conditions) in which conditions concerning image capturing information to select the class tables shown in FIG. 4C are registered. All the various kinds of tables shown in FIGS. 4A to 4C, 5A, and 5B are stored in the storage unit 5200.

In FIG. 4B, a class table of class table number=2 is additionally registered in the class index table shown in FIG. 4A. In FIG. 4B, there exist bins that satisfy R<θ for the two classes "flower" and "grass" in the class table of class table number=1. For this reason, a class table of class table number=2 in which the two classes "flower" and "grass" in the class table of class table number=1 are changed to a class "flowering plant" of a granularity coarser by one step is created and additionally registered in the class index table. Additionally, in the class table of class table number=1, there also exist bins that satisfy R<θ for the two classes "hair" and "skin". For this reason, in the class table of class table number=2, the two classes "hair" and "skin" in the class table of class table number=1 are changed to a class "face" of a granularity coarser by one step. Note that as for a class for which bins that satisfy R<θ do not exist, the class is held in the class table of class table number=2, as in the class table of class table number=1. That is, in the class table of class table number=2, the classes are defined with granularities coarser than in the class table of class table number=1. This also applies to the class index table shown in FIG. 4C.

Figure 6D:
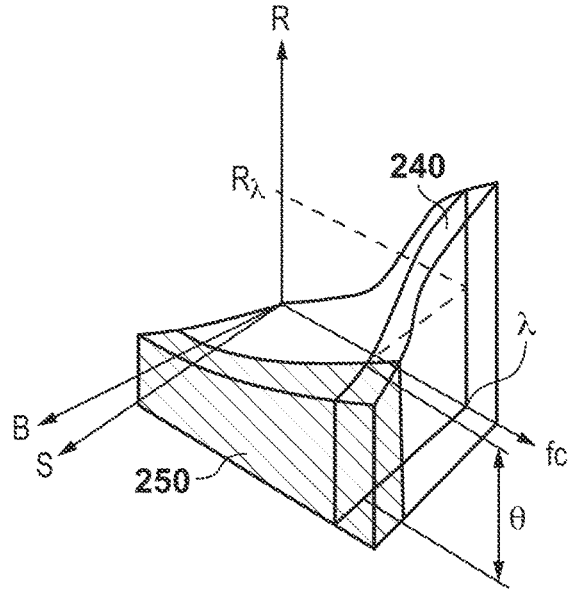

In FIG. 5A, whether to use the class table of class table number=1 or the class table of class table number=2 is defined in accordance with the combination of four conditions B<3, B≥3, S≥200, and S<200. For example, if a region corresponding to the range of the hatched portion 250 in FIG. 6D is B≥3 or S<200, the class table of class table number=2 is used for the range of B or S based on the conditions shown in FIG. 5A.

When the above-described processing for the class c is performed for all classes (the processing is performed by applying all classes to the class c), the process returns to step S2300. At this time, in step S2300, the learning unit 2300 performs the learning processing of the region discriminator again. The supervisory vector $\tau_r$ used at this time is a supervisory vector corrected in accordance with $$\tau_c = \begin{cases} 1 & \text{if } c \in C_r \\ 0 & \text{otherwise} \end{cases} \quad (9)$$

Cr indicates all labels assigned to the class corresponding to the label at the position r in the class table newly added to the class index table. For example, assume that the class table newly added to the class index table is the class table of class table number=2, and the label at the position r is "2". At this time, since the class corresponding to the label "2" at the position r is "flowering plant", all labels assigned to the class "flowering plant" are "1" and "2", and as a result, Cr={1, 2}.

If bins that satisfy R<θ do not exist for all classes, the learning is completed. As shown in FIGS. 4C and 5B, in this embodiment, a plurality of class tables in which the granularities of classes in class classification are different are created. As the blur amount becomes larger, or the image magnification becomes smaller, a class table in which the granularities of classes in class classification are coarser is used. As the blur amount becomes smaller, or the image magnification becomes larger, a class table in which the granularities of classes in class classification are finer is used. Note that the use conditions of the class tables are not limited to the conditions shown in FIGS. 5A and 5B.

After completion of the learning, the learning unit 2300 stores the generated region discriminator in the storage unit 5200. When the processes of steps S2300, S2400, and S2500 are repetitively performed in this way, a class that can hardly be classified is specified by image capturing information, and a class of a coarse granularity is set for such a class.

<Identification Function>

Components concerning the identification function in the components shown in FIG. 1A will be described next. Class identification by the identification function according to this embodiment indicates performing semantic segmentation for an unknown input image.

An acquisition unit 1100 acquires an input image and the image capturing information of the input image. An extraction unit 1300 segments the input image acquired by the acquisition unit 1100 into a plurality of small regions and extracts an image feature amount from each small region. An identification unit 1400 identifies the class of each small region on the input image using the region discriminator stored in the storage unit 5200 and the image feature amount extracted by the extraction unit 1300 from each small region on the input image. Class identification by the functional units according to the above-described identification function will be described next with reference to the flowchart of FIG. 2B.

In step S1100, the acquisition unit 1100 acquires an input image and the image capturing information of the input image. The acquisition method of the input image and the image capturing information is not limited to a specific acquisition method. For example, an input image and the image capturing information of the input image may be acquired from a memory device such as a hard disk drive or a memory card. Alternatively, an image captured by an image capturing unit such as a digital camera may be acquired as an input image, and the image capturing information of the input image may be acquired from the image capturing unit. In addition, the image capturing information may be acquired as information added to the input image. In this embodiment, the image capturing information includes a blur amount B(k) and an image magnification S(k) at each pixel position k of the input image.

In step S1300, the extraction unit 1300 segments the input image acquired by the acquisition unit 1100 in step S1100 into a plurality of small regions and extracts an image feature amount from each small region, as in step S2200. The image feature amount extracted from the small region at the pixel position k in the input image will be expressed as $y_k$ hereinafter.

In step S1400, the identification unit 1400 identifies the class of each small region on the input image using the learned region discriminator stored in the storage unit 5200 and the image feature amount extracted by the extraction unit 1300 from each small region on the input image in step S1300.

First, the identification unit 1400 inputs the image feature amount $y_k$ to the region discriminator acquired from the storage unit 5200, thereby obtaining a score vector $f(y_k)$ of each region class that is the output of the region discriminator. The score vector $f(y_k)$ of each region class has a configuration given by $$f(y_k) = [f_1(y_k) \ldots f_c(y_k) \ldots f_M(y_k)] \quad (10)$$

Then, the identification unit 1400 specifies an index $c_k$ of the element having the largest value in the elements $f_1(y_k), \ldots, f_M(y_k)$ of the score vector $f(y_k)$ as the label of the class to which the small region at the pixel position k on the input image belongs by $$c_k = \arg \max_c f_c(y_k) \quad (11)$$

Figure 7A:
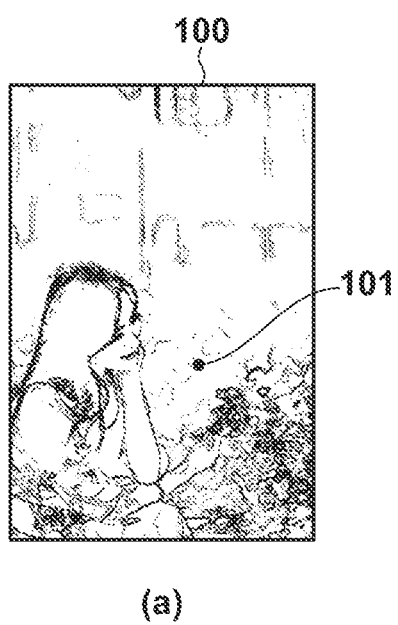
FIG. 7A is a view showing an input image 100.
Figure 7B:
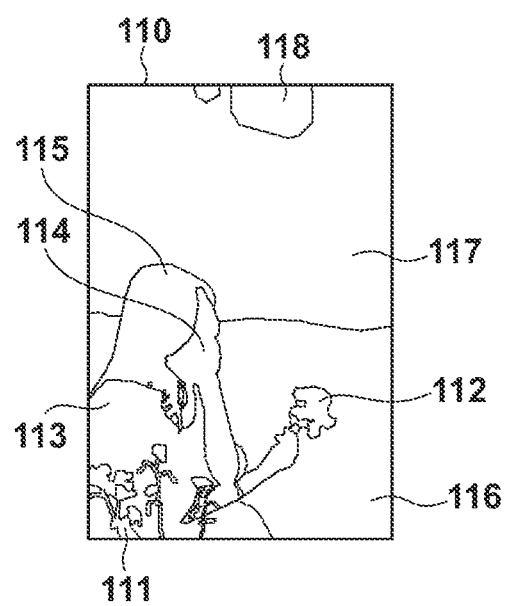
FIG. 7B is a view showing a class identification result 110.

In the above-described way, for each small region on the input image, the identification unit 1400 specifies the label $c_k$ of the class to which the small region belongs. Next, the identification unit 1400 specifies a class table number corresponding to the combination of the image magnification S(k) and the blur amount B(k) in the use conditions of the class tables shown in FIG. 5B. For example, assume that the acquisition unit 1100 acquires an input image 100 shown in FIG. 7A. If the image magnification S=10 pix/m, and the blur amount B=7 pix at a pixel position 101 on the input image 100, the class table number corresponding to the image magnification S and the blur amount B at the pixel position 101 is "5" based on the use conditions shown in FIG. 5B. That is, the class table of class table number=5 in the class index table shown in FIG. 4C is used for class identification of the small region at the pixel position 101. If $c_k=2$ by equation (11) described above for the pixel position 101, the class corresponding to the class index "2" is "plant" in the class table of class table number=5. The identification unit 1400 thus outputs, for each small region on the input image, a class corresponding to the label of the small region in the class table corresponding to the image capturing conditions of the small region as a class identification result. FIG. 7B shows a result of class identification performed by the identification unit 1400 for the input image 100 shown in FIG. 7A. In a class identification result 110, for regions 111 to 115 each having a small blur amount and a large image magnification, detailed class outputs such as "grass" for the region 111, "flower" for the region 112, "clothing" for the region 113, "skin" for the region 114, and "hair" for the region 115 are obtained. For a region 116 that is farther away and includes a strong blur, "plant" is output without distinction between "grass" and "flower". Regions 117 and 118 have larger blur amounts and smaller image magnifications because of the distance. Hence, "non-sky" for the region 117 and "sky" for the region 118 are obtained as the identification results.

As described above, in this embodiment, the granularity of the definition of a class to be determined is changed depending on the image capturing information, thereby performing learning such that reasonable recognition processing can be performed at the time of identification for each region on an image.

Figure 11A:
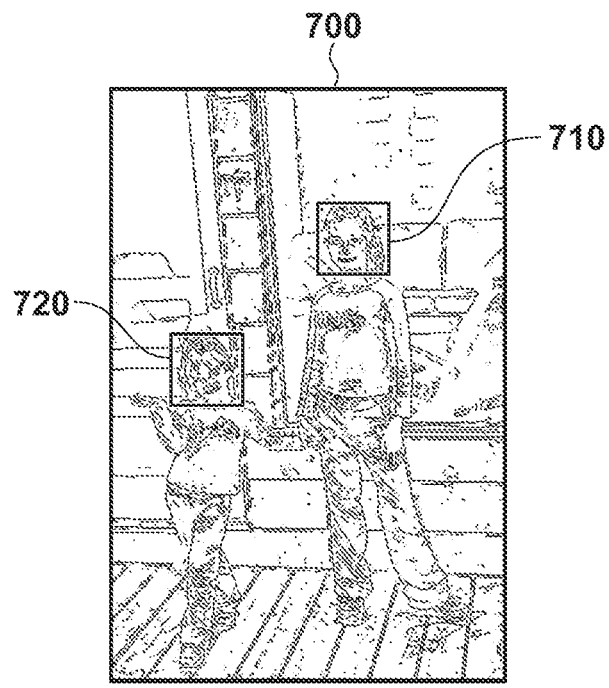
FIG. 11A is a view showing a modification of an identification target.

Note that in this embodiment, the description has been made assuming semantic segmentation for identifying each region of an image. However, the same processing as described above can also be performed for an object detector configured to perform person detection or the like and an object recognizer configured to perform individual identification or the like. For example, the above description can directly be applied when bounding boxes 710 and 720 indicating faces in an image 700 shown in FIG. 11A are regarded as the regions of a face class as an identification target. In addition, the recognition target is not limited to a face, and the processing is applicable to various targets such as an automobile and a plant.

Second Embodiment

In the first embodiment, an identification result is calculated using one region discriminator, and different class tables are used, thereby controlling the granularity of a final output class. In this embodiment, a plurality of region discriminators are learned, and the region discriminator is switched in accordance with image capturing information. In the following embodiments including this embodiment, the difference from the first embodiment will be described, and the embodiments are the same as the first embodiment unless it is specifically stated otherwise.

The operations of functional units concerning a learning function according to this embodiment will be described with reference to the flowchart of FIG. 2A. In this embodiment, the processes of steps S2300, S2400, and S2500 in the flowchart of FIG. 2A are different from the first embodiment. The processes of steps S2300, S2400, and S2500 according to this embodiment will be described below In step S2300 according to this embodiment, a learning unit 2300 performs learning of a region discriminator based on class definition of the most detailed granularity. A description will be made here by exemplifying the state shown in FIG. 4A as the most detailed class definition. In this case, the learning procedure is the same as step S2300 of the first time in the first embodiment, and a detailed description thereof will be omitted. When the initial learning ends, the learning unit 2300 stores the region discriminator that has undergone the initial learning in a storage unit 5200 in association with class table number "1".

In step S2400 according to this embodiment, an evaluation unit 2400 reads out (acquires) confirmation data from a storage unit 5300, and evaluates the region discriminator generated by the learning unit 2300 in step S2300 based on the readout confirmation data, as in the first embodiment.

In step S2500 according to this embodiment, a setting unit 2500 performs the same operation as in the first embodiment up to calculation of a correct answer rate R(S, B, fc) for an image magnification S, a blur amount B, and a reliability likelihood fc. If at least one of the identification rates R of bins in a space created for a class c satisfies R<θ, the setting unit 2500 additionally registers, in the class index table, a class table in which the class c is changed to a class c' of a granularity coarser by one step. FIG. 8 shows an example of the arrangement of the class index table according to this embodiment. The class table of class table number=1 is the same as the class table shown in FIG. 4A and is managed with the class count "16". The class table of class table number=2 is the same as the class table of class table number=2 shown in FIG. 4B except that one label is assigned to one class. For example, a class "flower" and a class "grass" are integrated to "flowering plant", and one label is assigned to the integrated class "flowering plant".

Class tables corresponding to class table numbers=3, 4, . . . , 7 are sequentially created in a similar manner and registered in the class index table.

In the first embodiment, every time a class table is additionally registered in the class index table, the learning unit 2300 performs re-learning of the same one region discriminator. In this embodiment, every time a class table is additionally registered in the class index table, the learning unit 2300 provides a new region discriminator and performs learning of the new region discriminator by generating a supervisory vector $\tau_r$ from the additionally registered class table, as in the first embodiment. That is, region discriminators are generated as many as the number of class table numbers. The learning unit 2300 performs learning of the newly provided region discriminator and stores the region discriminator in the storage unit 5200.

Figure 2B:
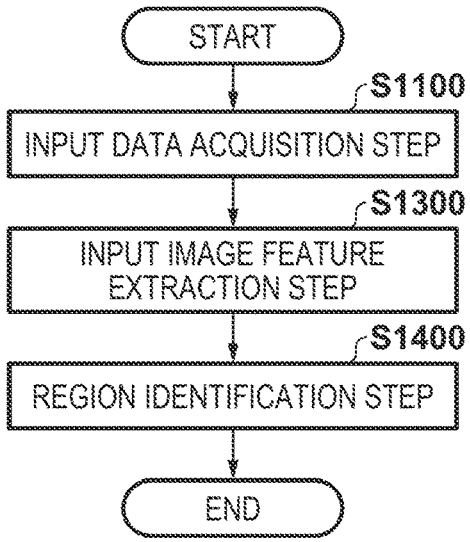

The operations of functional units concerning an identification function according to this embodiment will be described next with reference to the flowchart of FIG. 2B. In this embodiment, the process of step S1400 in the flowchart of FIG. 2B is different from the first embodiment. The process of step S1400 according to this embodiment will be described below.

In step S1400, an identification unit 1400 performs the following processing for a small region at each position k on an input image. First, the identification unit 1400 specifies a class table number corresponding to the combination of an image magnification S(k) and a blur amount B(k) at the position k of the small region in the use conditions of class tables shown in FIG. 5B. The identification unit 1400 reads out a region discriminator corresponding to the specified class table number from the storage unit 5200. The identification unit 1400 identifies the class of the small region at the position k as in the first embodiment using the readout region discriminator and the image feature amount of the small region at the position k extracted by an extraction unit 1300 in step S1100. At this time, the identification unit 1400 specifies a class table corresponding to the specified class table number in the class index table shown in FIG. 8, and outputs a class corresponding to a label $c_k$ in the specified class table as an identification result.

For example, regions 111 to 115 shown in FIG. 7B are regions each having a small blur amount and a large image magnification and, therefore, detailed class classification is performed using the region discriminator of class table number=1. In a region 116 that is farther away and includes a strong blur, identification is performed using the region discriminator of class table number=3. Regions 117 and 118 have larger blur amounts and are distant and, therefore, identification is performed using the region discriminator of class table number=6. Accordingly, recognition results of different class granularities are obtained for the regions.

Third Embodiment

In the first and second embodiments, an example in which the same image feature amount is always used as the image feature amount input to the region discriminator has been described. In this embodiment, the image feature amount to be extracted is changed depending on image capturing information.

Figure 1B:
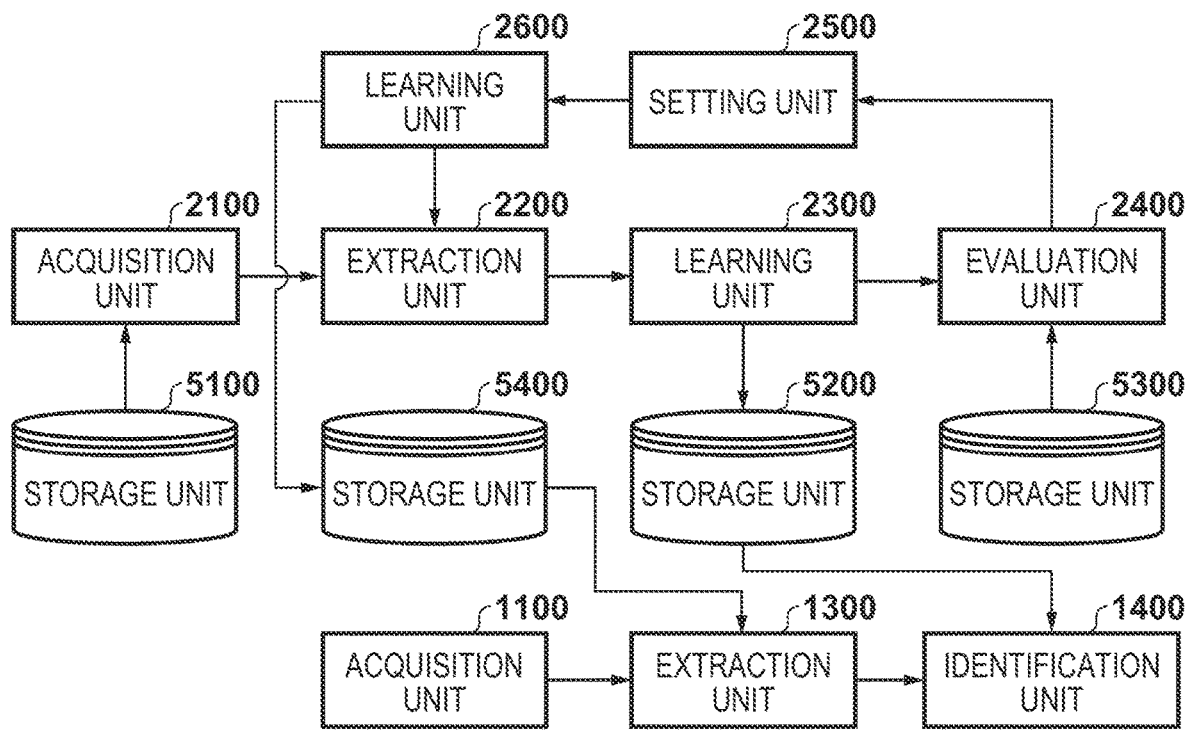
Figure 2C:
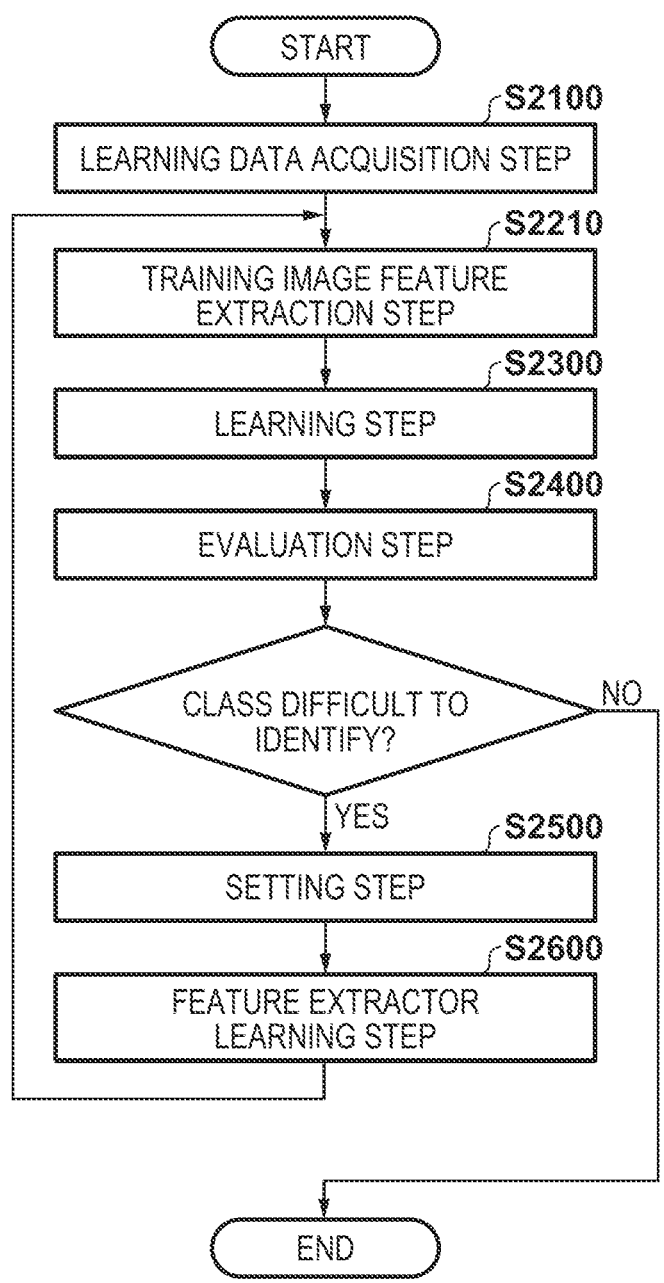
FIG. 2C is a flowchart of learning processing.

FIG. 1B shows an example of the functional arrangement of an image processing apparatus according to this embodiment. The operations of functional units concerning a learning function according to this embodiment in the functional units shown in FIG. 1B will be described first with reference to the flowchart of FIG. 2C. The same step numbers as in FIG. 2A denote the same processing steps in the flowchart of FIG. 2C, and a description thereof will be omitted.

In step S2210, an extraction unit 2200 segments each training image included in learning data acquired by an acquisition unit 2100 in step S2100 into a plurality of small regions and extracts an image feature amount from each small region. In this embodiment, a CNN (Convolutional Neural Network) is used as a feature extractor functioning as the extraction unit 2200. As the CNN serving as the feature extractor, an AlexNet or VGGNet can be used in general. These CNNs are learned for the 1000-class identification problem of ILSVRC (ImageNet Large-scale Visual Recognition Challenge). A CNN whose fully connected portion of the final stage in the learning result is excluded can also be used as a feature extractor for the purpose of general image recognition. When the CNN is used as the feature extractor, the above-described small region segmentation is not always needed. When small region segmentation is not performed, each pixel is regarded as one small region, and a peripheral region (receptive field) of a predetermined width with respect to a pixel position r on a training image as the center is input to the existing CNN. Accordingly, the output signals of the intermediate layers of the CNN are listed as image feature amounts, thereby extracting an image feature amount $x_r$ at the pixel position r on each training image. When small region segmentation is performed, the average of feature amounts obtained by the CNN from pixels in a small region may be used as the image feature amount of the small region. A description will be made below assuming that the small region segmentation is performed. When a pixel is handled as one small region, as described above, the following explanation does not lose generality.

In step S2600, a learning unit 2600 generates a new feature extractor using a reset class label. Using data corresponding to a bin corresponding to R<θ described above, fine adjustment (fine tuning) of the CNN serving as the feature extractor is performed. First, a data set is newly created by collecting data of a hatched portion 250 shown in FIG. 6D. A fully connected layer is added to the subsequent stage of the preceding stage portion of the CNN used as the feature extractor. Learning of the CNN is performed for the thus prepared full CNN using the above-described data set. At this time, the class definition complies with the class definition of a coarse granularity defined in the class table additionally registered in the class index table in step S2500 described above. As a contrivance to prevent over-learning, the learning coefficient of the fully connected layer at the subsequent stage may be set to a large value, and a weight coefficient may be set to a small value for the feature extraction portion of the preceding stage. Similarly, as a contrivance to prevent over-learning, not only the data set in the above-described image capturing information range difficult to recognize but also remaining data may be used as learning data at a low probability. The preceding stage portion of the thus learned CNN is stored as a new feature extractor in a storage unit 5400.

The process advances to step S2210, and the extraction unit 2200 extracts the image feature amounts of the small regions from each training image using the feature extractors stored in the storage unit 5400 at this point of time. After that, the process advances to step S2300.

Figure 9:
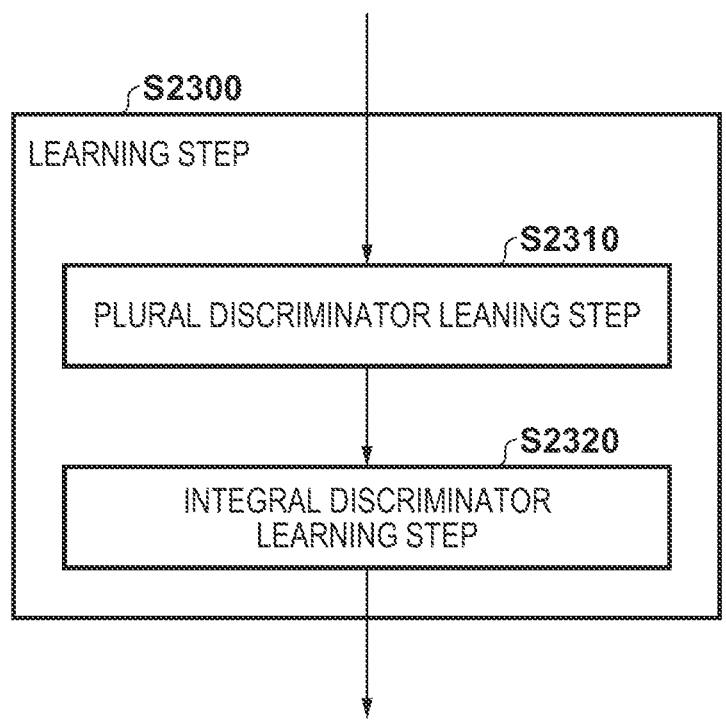
FIG. 9 is a flowchart showing step S2300 shown in FIG. 2C divided in detail.
Figure 10:
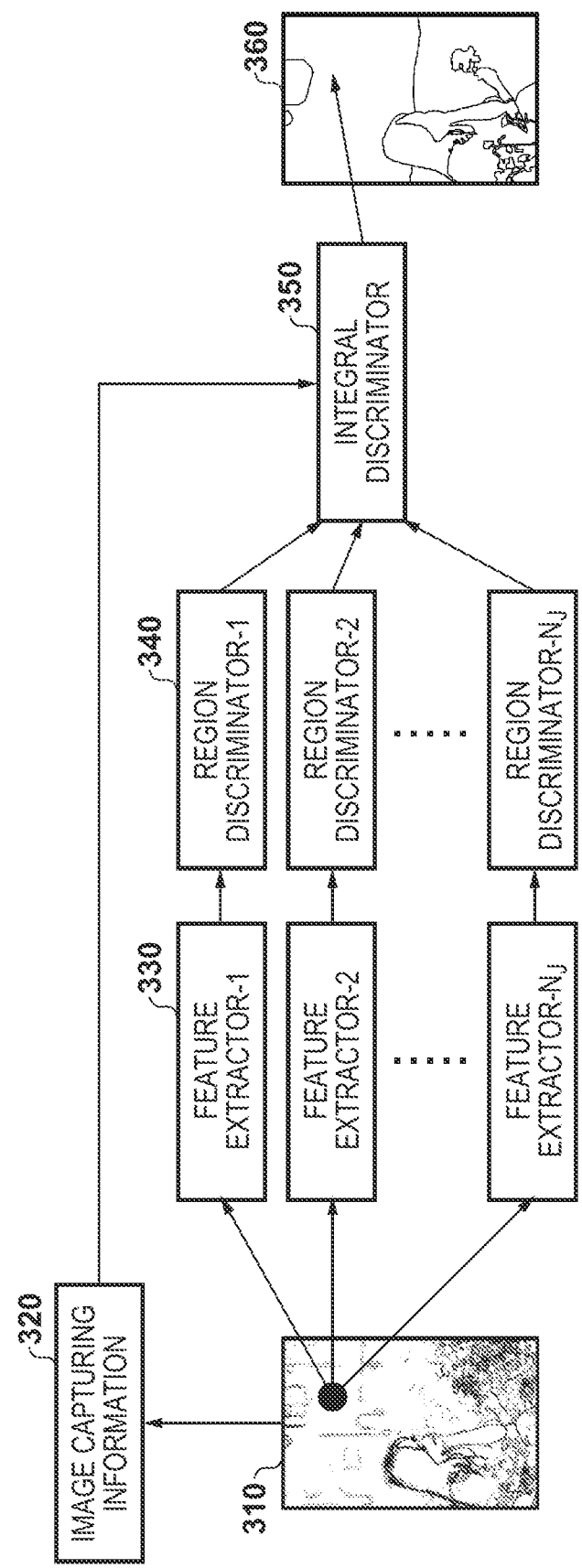
FIG. 10 is a view showing the arrangement of an entire discriminator.

The entire discriminator using the plurality of feature extractors obtained has an arrangement as shown in FIG. 10. In FIG. 10, reference numeral 310 denotes an input image; 320, image capturing information corresponding to the input image 310; 330, one feature extractor; and 340, a region discriminator using the feature extractor. Reference numeral 350 denotes an integral discriminator that integrates the outputs of the plurality of region discriminators. When the output of the integral discriminator 350 is calculated for all pixels, a final output result 360 is obtained. Learning is performed in two steps. FIG. 9 shows the procedure of step S2300 in FIG. 2C divided in detail.

In step S2310, a learning unit 2300 leans the region discriminators using the feature extractors generated so far. Here, the region discriminator is denoted by reference numeral 340 in FIG. 10. When the number of region discriminators is represented by NJ, and their indexes are represented by j=1, ..., NJ, NJ region discriminators are learned. A supervisory vector in each region discriminator is corrected as in equation (9) as follows.

$$\tau_c = \begin{cases} 1 & \text{if } c \in C_r \\ 0 & \text{otherwise} \end{cases} \quad (12)$$

where Cr is a set of labels included in a class assigned to the position r. In step S2320, the integral discriminator that integrates the NJ region discriminators learned in step S2310 is learned. The integral discriminator is denoted by reference numeral 350 in FIG. 10. The supervisory vector of the integral discriminator is the same as that represented by equation (12). The integral discriminator performs learning using class likelihoods output from the NJ region discriminators for the training images and a vector that lists pieces of image capturing information corresponding to the training images as an input vector. The generated region discriminators are stored in the storage unit 5200.

The operations of functional units concerning an identification function according to this embodiment in the functional units shown in FIG. 1B will be described next with reference to the flowchart of FIG. 2B. The process of step S1100 is the same as in the first embodiment.

In step S1300, an extraction unit 1300 reads out each feature extractor stored in the storage unit 5400. Using each readout feature extractor, the extraction unit 1300 segments an input image acquired by an acquisition unit 1100 in step S1100 into a plurality of small regions and extracts an image feature amount from each small region, as in step S2200.

In step S1400, an identification unit 1400 reads out the region discriminators corresponding to the feature extractors and the integral discriminator that integrates them from the storage unit 5400, and identifies the class of each small region on the input image. The feature extractors, the region discriminators, and the integral discriminator are combined as shown in FIG. 10, thereby identifying each small region of the input image.

In this way, a class difficult to classify is specified by image capturing information. A class of a coarse granularity is set for such a region, and an appropriate feature extractor can be obtained by the image capturing information.

Fourth Embodiment

In the first embodiment, image capturing information is information obtained in accordance with a pixel position on an image, such as an image magnification and a blur amount at each pixel position on an image. However, the image capturing information is not limited to this, and image capturing information capable of obtaining one value for one image independently of the pixel position on the image may be used. For example, a gravity sensor value, temperature information, position information by a GPS, and time information representing the state of an image capturing unit, an aperture value, an exposure time, and a gain representing conditions at the time of image capturing, a Bv value and a focus distance in a captured image, and the like may be used as image capturing information.

In this embodiment, a case in which the image capturing information includes an elevation angle (camera elevation angle) of an image capturing unit obtained by a gravity sensor provided in the image capturing unit, and the image capturing time of the image capturing unit will be described. When confirmation images included in confirmation data are represented by I1, I2, ..., IN, a camera elevation angle in a confirmation image In (1≤n≤N) is expressed as αn, and the image capturing time is expressed as Tn.

The operations of functional units concerning a learning function according to this embodiment will be described with reference to the flowchart of FIG. 2A. The processes of steps S2100 to S2400 are the same as in the first embodiment. In step S2500, a setting unit 2500 obtains an identification rate R(α, T, fc) of a class c. The calculation procedure of the identification rate R is the same as in the first embodiment. The elevation angle and the image capturing time (αn and Tn, respectively) corresponding to all small regions in one confirmation image In are the same. That is, the procedure is the same as in the first embodiment except that an elevation angle α of the image to which a small region belongs is used in place of the image magnification S at the position of the small region, and an image capturing time T of the image to which the small region belongs is used in place of the blur amount at the position of the small region.

The operations of functional units concerning an identification function according to this embodiment will be described next with reference to the flowchart of FIG. 2B. The processes of steps S1100 and S1300 are the same as in the first embodiment. In step S1400, an identification unit 1400 acquires, from the image capturing information of an input image, the camera elevation angle of the image capturing unit at the time of capturing of the input image and the image capturing time of the input image. For each small region on the input image, the identification unit 1400 identifies a label $c_k$ of a class to which the small region belongs, as in the first embodiment. Next, the identification unit 1400 specifies a class table number corresponding to the combination of the camera elevation angle of the image capturing unit at the time of capturing of the input image and the image capturing time of the input image in the use conditions of the class tables shown in FIG. 5B. The identification unit 1400 outputs a class corresponding to the label $c_k$ of the class to which the small region belongs in the class table corresponding to the specified class table number as a class identification result for the small region, as in the first embodiment.

Note that some or all of the above-described embodiments may be appropriately combined or selectively used. For example, in the above-described embodiments, the description has been made assuming that one image processing apparatus has both the learning function and the identification function. However, the image processing apparatus may be divided into an apparatus having the learning function and an apparatus having the identification function. In this case, the storage unit 5200 may be individually provided in each apparatus. Information stored in the storage unit 5200 of the apparatus having the learning function is copied to the storage unit 5200 of the apparatus having the identification function. This also applies to the storage unit 5400. In addition, the image processing apparatus having the arrangement shown in FIG. 1A or 1B may be formed by two or more apparatuses. Numerical values used in the description of the above-described embodiments are merely examples, and the above-described embodiments are not limited to these numerical values.

Fifth Embodiment

Figure 11B:
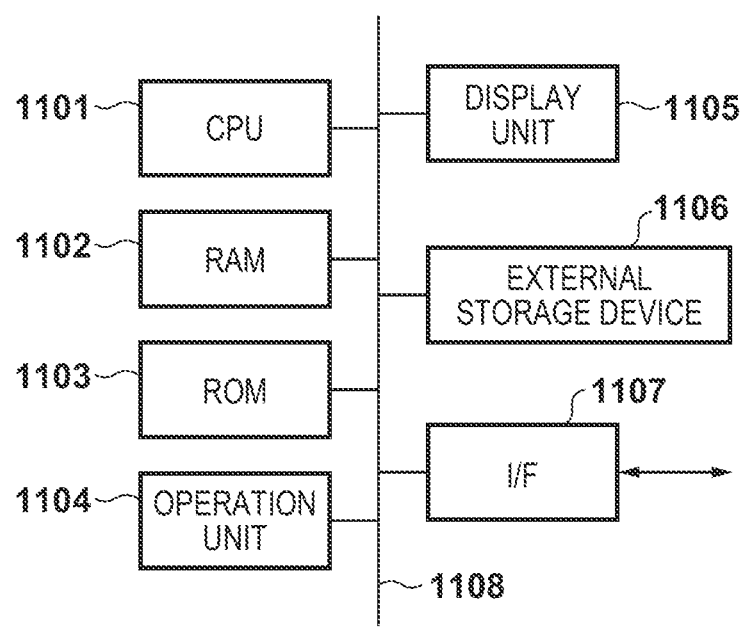
FIG. 11B is a view showing an example of the hardware arrangement of a computer apparatus.

The functional units shown in FIGS. 1A and 1B may be implemented by hardware, or the functional units other than storage units 5100, 5200, 5300, and 5400 may be implemented by software (computer program). In the former case, the functional units shown in FIGS. 1A and 1B which are implemented by hardware can be mounted as embedded circuits in an image capturing unit such as a digital camera. In the latter case, at least one memory functioning as the storage units 5100, 5200, 5300, and 5400 is provided, and a computer apparatus capable of executing the software can be applied to an image processing apparatus. Note that the storage units 5100, 5200, 5300, and 5400 may be memories detachable from the image processing apparatus. An example of the hardware arrangement of the computer apparatus applicable to the image processing apparatus will be described with reference to the block diagram of FIG. 11B.

A CPU 1101 executes various kinds of processing using computer programs and data stored in a RAM 1102 and a ROM 1103. The CPU 1101 thus controls the operation of the entire computer apparatus, and also executes or controls each of the processes explained above as processes to be executed by the image processing apparatus.

The RAM 1102 has an area to store a computer program or data loaded from the ROM 1103 or an external storage device 1106 or data received from the outside via an I/F (interface) 1107. In addition, the RAM 1102 has a work area to be used by the CPU 1101 to execute various kinds of processes. The RAM 1102 can thus provide various kinds of areas as needed. The ROM 1103 stores computer programs and data which do not need rewrite.

An operation unit 1104 is formed by user interfaces such as a mouse and a keyboard. A user can input various kinds of instructions to the CPU 1101 by operating the operation unit 1104. For example, the user can input, to the CPU 1101, an operation start instruction of the above-described learning function, a training image selection instruction, an input image input instruction, an identification start instruction for an input image, and the like by operating the operation unit 1104.

A display unit 1105 is formed by a CRT or a liquid crystal screen and can display the processing result of the CPU 1101 as an image or characters. For example, a training image, a confirmation image, an input image, an identification result, various numerical values output in the processing process, and the like can be displayed on the display screen of the display unit 1105. Note that the display unit 1105 may be a touch panel screen.

The external storage device 1106 is a mass information storage device represented by a hard disk drive. The external storage device 1106 stores an OS (Operating System) or computer programs and data configured to cause the CPU 1101 to execute or control each of the processes explained above as processes to be executed by the image processing apparatus. The computer programs stored in the external storage device 1106 include a computer program configured to cause the CPU 1101 to execute the functions of the functional units other than the storage units 5100, 5200, 5300, and 5400 in FIGS. 1A and 1B. In addition, the data stored in the external storage device 1106 includes data (for example, a threshold) explained as known information in the above description and various kinds of data explained above as data stored in the storage units 5100, 5200, 5300, and 5400. The computer program or data stored in the external storage device 1106 is loaded to the RAM 1102 as needed under the control of the CPU 1101 and processed by the CPU 1101. Note that the storage units 5100, 5200, 5300, and 5400 are formed by a memory such as the external storage device 1106, the RAM 1102, or the ROM 1103.

The I/F 1107 functions as an interface used to perform data communication with an external device. For example, an image capturing unit can be connected to the I/F 1107, and an image captured by the image capturing unit can be acquired in the external storage device 1106 or the RAM 1102 via the I/F 1107 as a training image, a confirmation image, or an input image.

All of the CPU 1101, the RAM 1102, the ROM 1103, the operation unit 1104, the display unit 1105, the external storage device 1106, and the I/F 1107 are connected to a bus 1108.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-134949, filed Jul. 10, 2017, which is hereby incorporated by reference herein in its entirety.

What is claimed is:

1. An image processing apparatus comprising:
  a discriminator that has undergone learning based on image feature of a first image to perform class identification at each of a plurality of granularities, wherein:

the plurality of granularities include a first granularity and a second granularity coarser than the first granularity, and a class of interest, among classes defined with the second granularity, is an integrated class obtained by integrating some classes corresponding to the class of interest, among classes defined with the first granularity; and one or more processors configured to execute a plurality of tasks, including:

an acquisition task that acquires an input image;

a selection task that selects, based on image information of the input image, a granularity used for class identification of the input image from the plurality of granularities; and an identification task that, based on an output obtained by inputting an image feature of the input image and the granularity selected by the selection task to the discriminator, performs class identification of the input image at the granularity selected by the selection task.

2. The apparatus according to claim 1, wherein the plurality of tasks include:

a learning task that performs the learning of the discriminator based on the image feature of the first image and a first class of the first image defined by the first granularity;

an evaluation task that evaluates an image feature of a second image whose class is known by the discriminator after the learning by the learning task; and a control task that controls the learning task to, in a case where evaluation by the evaluation task is that a predetermined criterion is not satisfied, perform the learning of the discriminator based on the image feature of the first image and a second class of the first image defined by the second granularity.

3. The apparatus according to claim 2, wherein in a case where the discriminator after the learning satisfies the predetermined criterion, the learning task stores, in a storage, the discriminator after the learning by the learning task.

4. The apparatus according to claim 2, wherein in a case where the evaluation task evaluates a correct answer rate of a class of the second image obtained by inputting the image feature of the second image to the discriminator after the learning by the learning task, and image information of the second image for which the correct answer rate is less than a threshold exists, the evaluation task evaluates that the predetermined criterion is not satisfied.

5. The apparatus according to claim 4, wherein the learning task associates the image information of the second image for which the correct answer rate is less than the threshold with the second granularity.

6. The apparatus according to claim 4, wherein the image information of the second image includes an elevation angle of an image capturing unit that captures the second image and an image capturing time of the second image.

7. The apparatus according to claim 2, wherein the plurality of tasks include another learning task that performs learning of a feature extractor configured to extract an image feature amount of an image.

8. The apparatus according to claim 2, wherein:

the image information includes an image magnification in each pixel of an image, and the identification task identifies a class of the input image obtained by inputting the image feature of the input image to the discriminator that has undergone the learning by the learning task by a class of a finer granularity as the image magnification becomes larger or by a class of a coarser granularity as the image magnification becomes smaller.

9. The apparatus according to claim 1, wherein the image information includes an image magnification in each pixel of an image.

10. The apparatus according to claim 1, wherein the image information includes a blur amount.

11. The apparatus according to claim 10, wherein:

the plurality of tasks include a learning task that performs the learning of the discriminator, and the identification task identifies a class of the input image obtained by inputting the image feature of the input image to the discriminator that has undergone the learning by the learning task by a class of a coarser granularity as the blur amount becomes larger or by a class of a finer granularity as the blur amount becomes smaller.

12. The apparatus according to claim 1, wherein the plurality of tasks include an extracting task that extracts the image feature of the input image.

13. The apparatus according to claim 12, wherein the extracting task segments the input image into a plurality of small regions and extracts an image feature of each respective image from the small regions.

14. The apparatus according to claim 12, wherein the extracting task inputs the input image into a neural network having a plurality of layers, and extracts output of an intermediate layer of the neural network as the image feature of the input image.

15. The apparatus according to claim 1, wherein the image information includes at least one of a blur amount in each pixel of an image, distance information, a gain, an aperture value, a focus distance, an incident light amount, a RAW image, an exposure time, a white balance coefficient, distance information, or position information.

16. An image processing method performed by an image processing apparatus including a discriminator that has undergone learning based on an image feature of a first image to perform class identification at each of a plurality of granularities, wherein the plurality of granularities include a first granularity and a second granularity coarser than the first granularity, and wherein a class of interest, among classes defined with the second granularity, is an integrated class obtained by integrating some classes corresponding to the class of interest, among classes defined with the first granularity, the method comprising:

acquiring an input image;

selecting, based on image information of the input image, a granularity used for class identification of the input image from the plurality of granularities; and performing class identification of the input image at the selected granularity-, based on an output obtained by inputting an image feature of the input image and the selected granularity to the discriminator.

17. A non-transitory computer-readable storage medium storing a computer program executable by a computer to execute a method for an image processing apparatus including a discriminator that has undergone learning based on an image feature of a first image to perform class identification at each of a plurality of granularities, wherein the plurality of granularities include a first granularity and a second granularity coarser than the first granularity, and wherein a class of interest, among classes defined with the second granularity, is an integrated class obtained by integrating some classes corresponding to the class of interest, among classes defined with the first granularity, the method comprising:
- acquiring an input image;
- selecting, based on image information of the input image, a granularity used for class identification of the input image from the plurality of granularities; and
- performing class identification of the input image at the selected granularity, based on an output obtained by inputting an image feature of the input image and the selected granularity to the discriminator.

* * * * *